(12) United States Patent
Elliott et al.

(10) Patent No.: US 7,658,438 B1
(45) Date of Patent: Feb. 9, 2010

(54) SIMULTANEOUS SINGLE RAIL MOVEMENT SYSTEM FOR A VEHICLE DOOR

(75) Inventors: Adrian Nicholas Alexander Elliott, Dearborn, MI (US); Jason Falenski, Berkley, MI (US); Dave Michael Lechkun, Shelby Township, MI (US); Craig Blust, Oakland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/275,546

(22) Filed: Nov. 21, 2008

(51) Int. Cl.
*B60J 5/06* (2006.01)

(52) U.S. Cl. .................................................. 296/155

(58) Field of Classification Search ........... 296/155, 296/146.11, 146.12, 190.11; 49/209, 211, 49/216, 218, 219, 220, 221, 223, 254, 348, 49/360
See application file for complete search history.

(56) References Cited

U.S. PATENT DOCUMENTS

| 3,758,990 | A * | 9/1973 | Balanos .................... 49/153 |
| 4,025,104 | A * | 5/1977 | Grossbach et al. .......... 296/155 |
| 4,135,760 | A * | 1/1979 | Grossbach ................ 296/155 |
| 5,507,119 | A * | 4/1996 | Sumiya et al. .............. 49/218 |
| 5,921,613 | A * | 7/1999 | Breunig et al. ............. 296/155 |
| 6,926,342 | B2 | 8/2005 | Pommeret et al. |
| 7,243,978 | B2 | 7/2007 | Mather et al. |
| 7,393,044 | B2 | 7/2008 | Enomoto |
| 2006/0249983 | A1* | 11/2006 | Heuel et al. ................ 296/155 |
| 2006/0267375 | A1* | 11/2006 | Enomoto .................... 296/155 |
| 2009/0000200 | A1* | 1/2009 | Heuel et al. .................. 49/209 |
| 2009/0072583 | A1* | 3/2009 | Elliott et al. ............... 296/155 |
| 2009/0200833 | A1* | 8/2009 | Heuel et al. ................ 296/155 |

FOREIGN PATENT DOCUMENTS

| DE | 102004039885 | 2/2006 |
| EP | 0875434 | 11/1998 |
| EP | 0957019 | 11/1999 |
| JP | 2004175199 | 6/2004 |
| JP | 2005153738 | 6/2005 |
| JP | 2008094323 | 4/2008 |
| WO | WO 02/42589 | 5/2002 |

* cited by examiner

*Primary Examiner*—Hilary Gutman
(74) *Attorney, Agent, or Firm*—Dykema Gossett PLLC; Gregory P. Brown

(57) ABSTRACT

A simultaneous single rail movement system for a vehicle door includes an outboard hinge arm, an inboard hinge arm, a rail, and a guide track. The outboard hinge arm includes a first outboard end and a second outboard end. The outboard hinge arm is pivotally mounted to a vehicle body structure at the first outboard end. The outboard hinge arm includes a first region or point, and a second region or point. The inboard hinge arm includes a first inboard end and a second inboard end. The inboard hinge arm is pivotally mounted to a vehicle body structure at the first inboard end. The rail may be mounted to a vehicle door and is configured to receive the slide member. The slide member is pivotally mounted to the first point of the outboard hinge arm and the second inboard end. The guide track is adjacent to the rail and is configured to receive the second region or point of the outboard hinge arm. The guide track includes a substantially curved portion and a substantially linear portion. The substantially curved portion of the guide track extends beyond the rail in a longitudinal direction aft of the rail in a manner sufficient to facilitate continuous and smooth movement of the door upon opening and upon closing.

11 Claims, 3 Drawing Sheets

SIMULTANEOUS SINGLE RAIL MOVEMENT SYSTEM FOR A VEHICLE DOOR

BACKGROUND

The present disclosure relates generally to hinge and slide devices, and more particularly, to such a device for vehicle doors.

Sliding door structures are generally implemented on vehicles to reduce the door swing distance from the vehicle body; to allow for better ingress and egress into or from a vehicle; and to provide more efficient use of vehicle space. This type of design may be particularly helpful when a user is parking a vehicle in a confined area where there is little available room for door swing.

In the sliding door structure, guide rails are generally included at the roof rail/cant rail and rocker/sill as well as adjacent to a vehicle body class A surface. It is to be understood that the class A surface of a vehicle is the exterior area of the vehicle that is visible. The guide rail on the class A surface is generally configured as a linear track just below the side window. In addition, such vehicles generally also implement a curved guide track on the vehicle body at the sill/rocker and/or side rail/cant rail to guide the sliding door into the closed position against the vehicle body. To open a traditional sliding door, the sliding door is projected in a vehicle exterior direction along the curved portion of the guide rail, and then the sliding door is translated along the linear portion to a fully opened position. To close the sliding door, the sliding door is moved to the curved portion from the linear portion of the guide rail until the sliding door is pulled inward toward the vehicle.

However, a traditional sliding door movement does coincide with the curved shape of the guide rail once it transitions from the linear portion to the curved portion resulting in a two step operation for opening and closing the sliding door, thereby resulting in disrupted motion as the vehicle door is opened and closed. Moreover, it is to be understood that implementation of a sliding door on sedan vehicles, sports coupes, trucks, etc. may in some instances provide additional challenges due to their specific and varied body architectures. As such, sliding door systems are traditionally implemented on larger vehicles such as vans/minivans, which have ample area to mount sliding systems on the vehicle body itself.

SUMMARY

A simultaneous single rail movement system according to embodiment(s) disclosed herein includes an outboard hinge arm, an inboard hinge arm, a rail, a slide member, and a guide track. The outboard hinge arm includes a first outboard end and a second outboard end. The outboard hinge arm is pivotally mounted to a vehicle body structure at the first outboard end. The outboard hinge arm includes a first region or point and a second region or point. The inboard hinge arm includes a first inboard end and a second inboard end. The inboard hinge arm is pivotally mounted to a vehicle body structure at the first inboard end. The rail may be mounted to a vehicle door and is configured to receive the slide member. The slide member is pivotally mounted to the first point of the outboard hinge arm and the second inboard end. The guide track is adjacent to the rail and is configured to receive the second region or point of the outboard hinge arm. The guide track includes a substantially curved portion and a substantially linear portion. The substantially curved portion of the guide track extends beyond the rail in a longitudinal direction aft of the rail in a manner sufficient to facilitate continuous and smooth movement of the door upon opening and upon closing.

BRIEF DESCRIPTION OF THE DRAWINGS

Features and advantages of embodiments of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
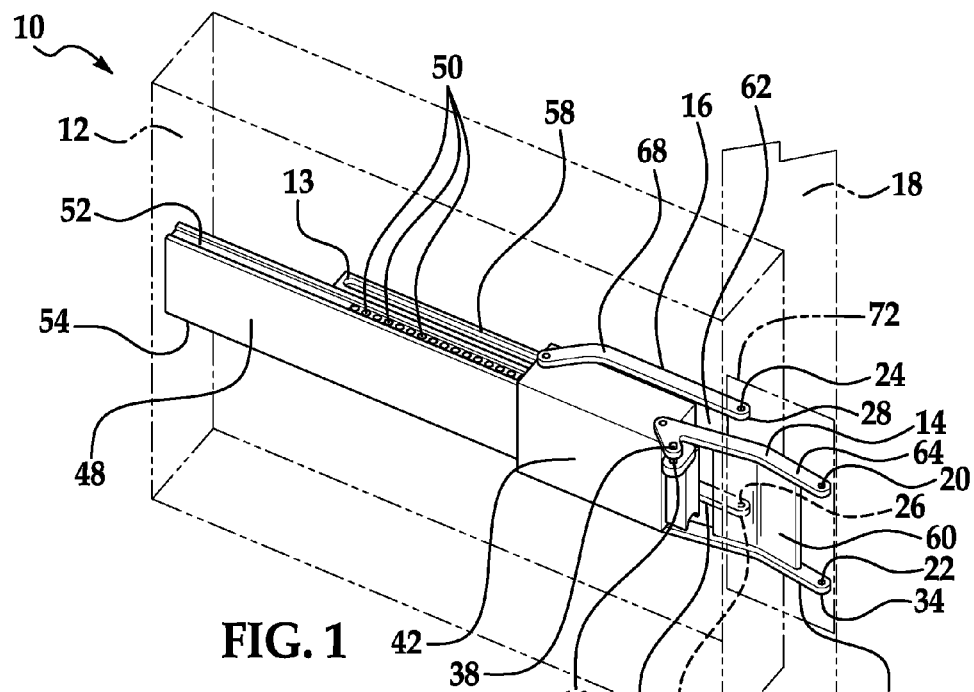
FIG. 1 is an isometric view of an embodiment of a simultaneous movement single rail door system (vehicle door and vehicle body shown in phantom) when the door is in the closed position.
Figure 2:
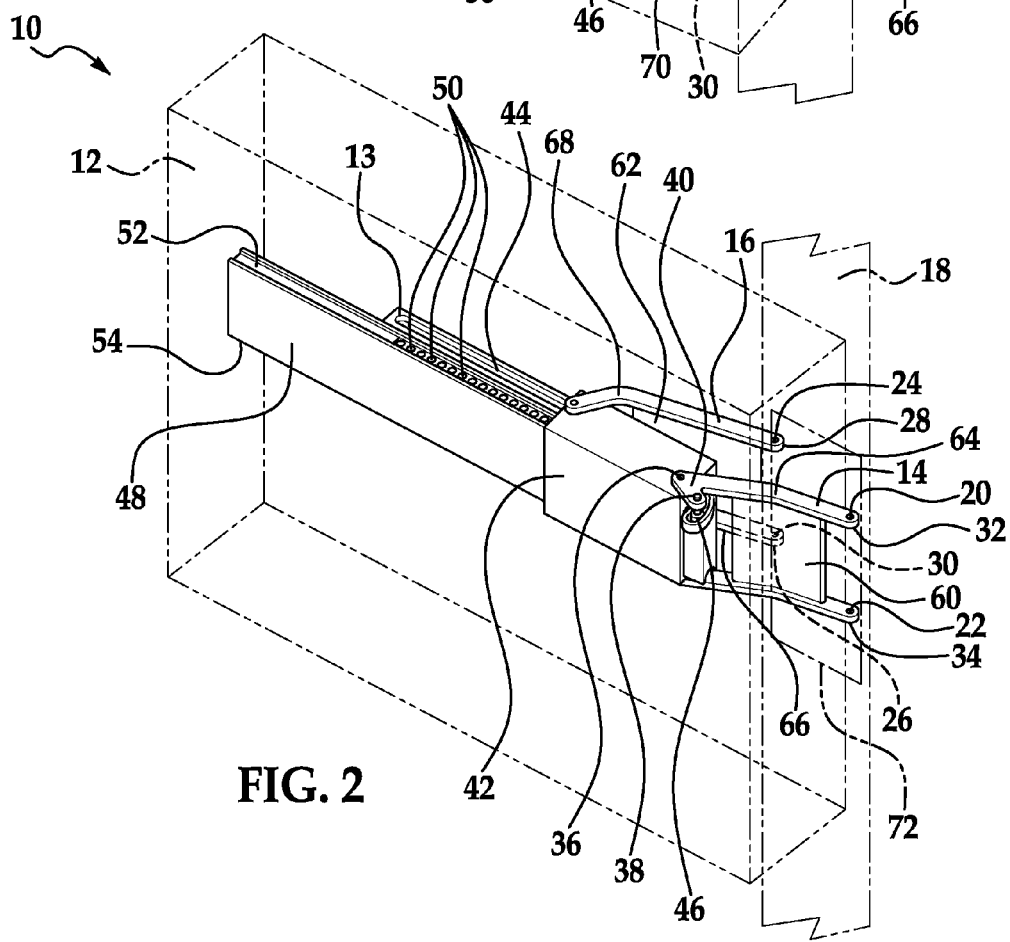
FIG. 2 is an isometric view of the simultaneous movement single rail door system of FIG. 1 (vehicle door and vehicle body shown in phantom) when the door is in its initial opening state.
Figure 3:
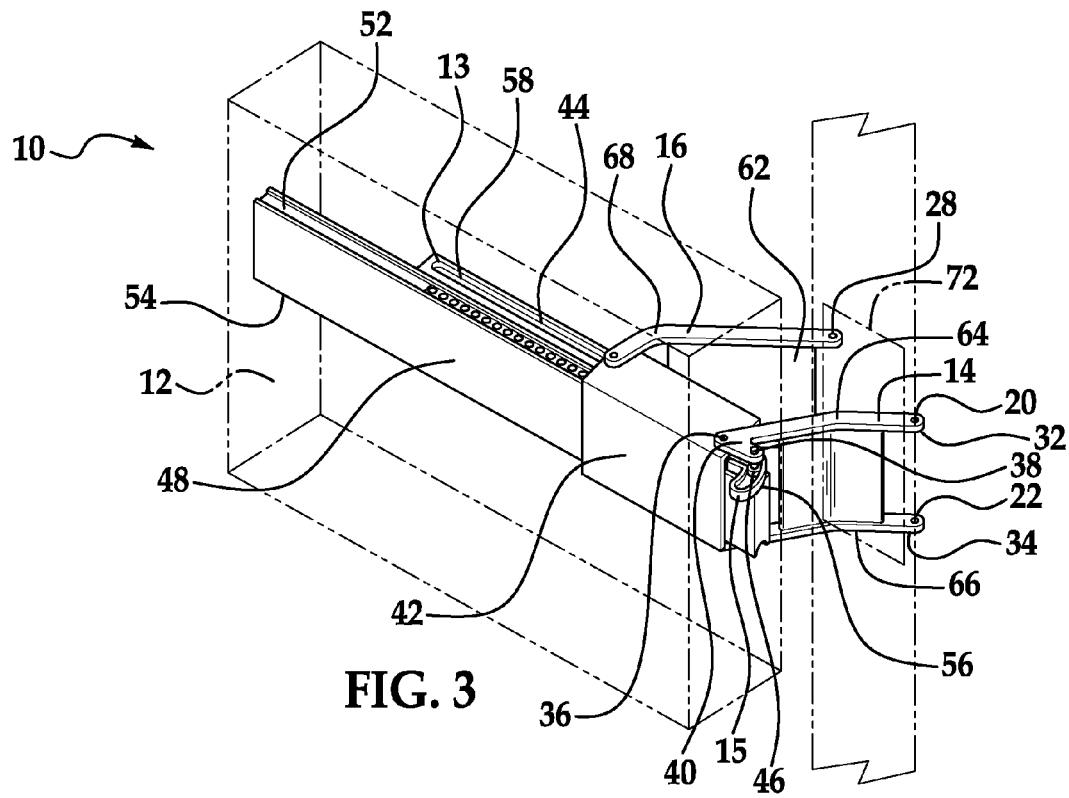
FIGS. 3 and 4 are isometric views of the simultaneous movement single rail door system of FIG. 1 (vehicle door and vehicle body shown in phantom) when the door is in its progressively opening states.
Figure 4:
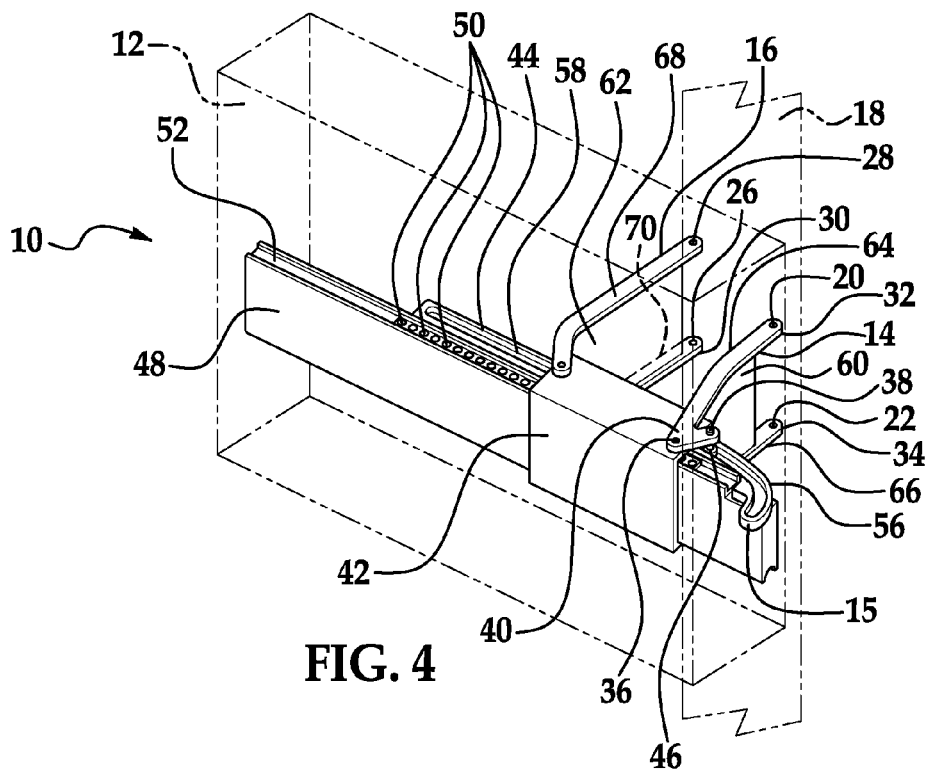
Figure 5:
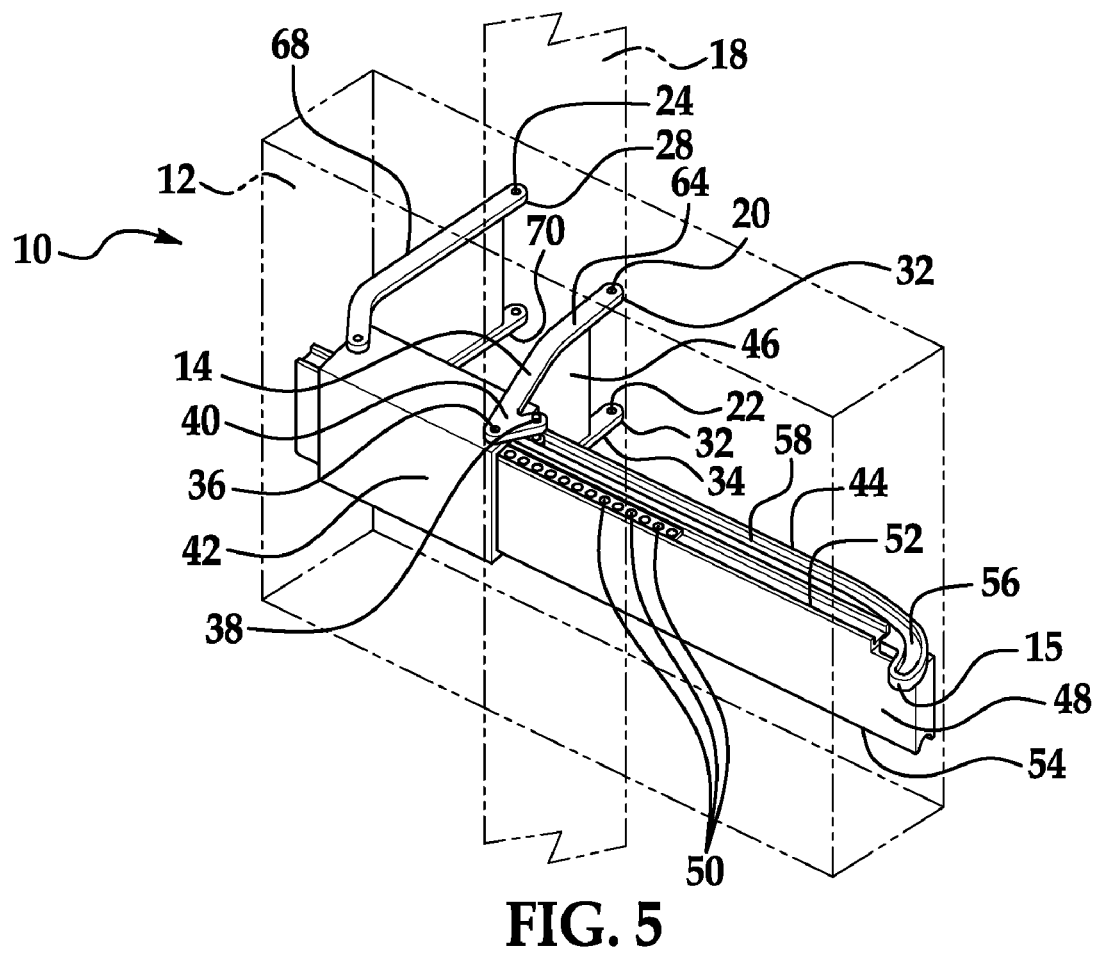
FIG. 5 is an isometric view of the simultaneous movement single rail door system of FIG. 1 (vehicle door and vehicle body shown in phantom) when the door is in its fully open state.

Embodiment(s) of the present disclosure include a simultaneous movement single rail door system wherein the class A surface of the vehicle is not disrupted with a door track for the sliding door system, and allows for simultaneous sliding and articulating of a vehicle door where the packaging/mounting area of such a system on a vehicle may be limited. The simultaneous movement single rail system disclosed herein substantially and advantageously overcomes at least the potential drawbacks noted in the background above.

The simultaneous movement system allows for simultaneous articulation and translation of the vehicle door which may be mounted on a single body side member. Moreover, the simultaneous movement system for a door of the present disclosure is robust in design and may involve fewer components than traditional sliding door systems.

Referring now to FIGS. 1-5 together, a simultaneous movement single rail door slide system 10 for a vehicle door 12 may generally be mounted onto a vehicle (not shown). As shown in FIGS. 1-5, and described in greater detail below, in order to facilitate ingress and egress into and from a vehicle (not shown) such as, but not limited to, a sedan or a sports coupe, a simultaneous movement single rail door slide system 10 is provided. The simultaneous movement single rail door system may allow smooth opening/closing of a door 12 independent of another adjacent structure or door (not shown) being open or closed.

As shown in FIGS. 1-5, a simultaneous movement single mount door slide system 10 may include an inboard hinge arm 16 and an outboard hinge arm 14. It is to be understood that this arrangement of the inboard and outboard hinge arm is a four bar link arrangement. It is further to be understood that the term, inboard, refers to a component, such as the non-limiting example of inboard hinge arm 16, that is disposed closer to the interior of the vehicle (not shown) when the door is in a closed position particularly when that component is compared relative to an outboard component such as outboard hinge arm 14. It is further to be understood that the term, outboard, refers to a component that is disposed closer to the exterior of the vehicle (not shown). A non-limiting example of an outboard member is the outboard hinge arm 14 that is disposed closer to the exterior of the vehicle relative to the inboard hinge arm 16 when the door is in the closed position.

Outboard hinge arm 14 is pivotally mounted to a vehicle pillar 18 at pivot joints 20, 22 at first ends 32, 34 of outboard hinge arm 14. Inboard hinge arm 16 is also pivotally mounted to vehicle pillar 18 or the vehicle body structure at pivot joints 24, 26 at body ends 28, 30 of inboard hinge arm 16. The outboard and inboard hinge arms 14, 16 (respectively) may be pivotally mounted on a single vehicle mounting bracket 72. This allows for improved packaging capability where the surface area for mounting the hinge system of the sliding door is reduced given that the mounting of the door system is effected at body ends 28, 30, 32, 34 of inboard and outboard hinge arms 16, 14 (respectively).

Moreover, the present disclosure provides for improved vehicle aesthetics given that this door slide system 10 does not require any guide tracks to be placed on the class A surface of a vehicle. Further, there is no concern for any exterior guide tracks becoming blocked with outdoor debris given the absence of guide tracks exterior to the vehicle.

It is to be understood that the terms regions and points are being used alternatively in that both terms (points and regions) are to be understood to be small, discrete areas on a member intended for a particular use. Outboard hinge arm 14 is operatively configured to include at least two (regions or) points 36, 38 proximate to the door end 40 of upper outboard hinge arm 14. Upper outboard hinge arm 14 is pivotally connected to slide member 42 at upper outboard hinge arm first (region or) point 36 and slidably engaged with guide track 44 at upper outboard hinge arm second (region or) point 38. It is to be understood that each of upper and lower outboard hinge arms 64, 66 respectively may have (regions or) points 36, 38. It is further to be understood that (regions or) points 36, 38 may exist on the upper outboard hinge arm 14, on the lower outboard hinge arm, or on both. Second (region or) second point 38 may include a one-piece tab 46, projection, roller, or pin-like structure which fits within an upper surface 52 of guide track 44 as shown in FIGS. 1-5 to guide the door 12 as it articulates and translates relative to the pillar 18 or vehicle body structure member. As a non-limiting example, tab 46 may be integral with outboard hinge arm 14 as shown in FIGS. 1-5. It is also to be understood that a nut and bolt (not shown) or any suitable fastening means may affix tab 46 to second (region or) point 38 on outboard hinge arm 14.

As shown in FIGS. 1-5, simultaneous movement single rail door slide system 10 includes rail 48 mounted to vehicle door 12. Rail 48 and guide track 44 may include abutments 13, 15 integral with the track configuration in order to define the limit to which the door 12 may travel relative to the pillar 18. In two non-limiting examples, rail 48 and guide track 44 may be mounted to a door inner system (not shown) and/or a door hardware system (not shown) via any suitable fastening means, including but not limited to mechanical fasteners, welding, press-fitting, interlocking, other suitable joining methods, or combinations thereof. Rail 48 may be, e.g., an extruded or cast member. Rail 48 is operatively configured to receive slide member 42.

Slide member 42 as shown in FIG. 1 is one non-limiting example in which one may implement a sliding structure along rail 48. As illustrated, slide member 42 is a sleeve in FIGS. 1-5 which receives rail 48. Rail 48 may include ball bearings 50 along the upper surface 52 and/or lower surface 54 of the rail 48 to facilitate movement of the sleeve or slide member 42 along rail 48. It is to be understood that ball bearings 50 are a non-limiting example, and other suitable components such as roller bearings (not shown) or a lubricated track (not shown) or the like may be implemented with slide member 42. Moreover, it is also to be further understood that a motor (not shown) may, but is not required to be used to power open and power close the system 10. Slide member 42 may be manufactured using a stamped, roll forming, casting or other suitable process.

In order to allow vehicle door 12 to articulate and slide simultaneously and smoothly, guide track 44 is implemented. As indicated earlier, guide track 44 is operatively configured to receive second (region or) point 38 on outboard hinge arm 14. Guide track 44 includes a substantially curved portion 56 and a substantially linear track portion 58 to allow smooth and simultaneous articulation and sliding movement of vehicle door 12 as outboard hinge arm 14, (region or) point 38, and projection 46 travel along guide track 44.

In one non-limiting example, guide track 44 may be mounted on door inner panel (not shown). In yet other non-limiting examples, guide track 44 may be mounted on door hardware structures (not shown), or guide track 44 may also be integral with rail 48. Moreover, as shown in FIGS. 1-5, guide track 44 may be affixed to rail 48. Guide track 44 may extend beyond rail 48 in a longitudinal direction proximate the aft area of the vehicle door to facilitate continuous movement of the door 12 upon opening (as shown in the progressive opening of vehicle door 12 in FIGS. 1-5), until vehicle door 12 attains the full open position.

Moreover, in order to further facilitate smooth cooperation and improve stability between all portions of outboard hinge arm 14, inboard hinge arm 16, and slide member 42, a substantially planar member 60, 62 may be disposed within each outboard hinge arm 14 and inboard hinge arm 16. As shown in FIGS. 1-5, substantially planar member 60 is integral with outboard hinge arm 14 and is disposed between upper portion 64 of outboard hinge arm 14 and lower portion 66 of outboard hinge arm. Substantially planar member 62 of inboard hinge arm 16 is also shown in FIGS. 1-5 as being integral with upper portion 68 of inboard hinge arm 16 and lower portion 70 of inboard hinge arm 16. However, it is to be understood that substantially planar members 60, 62 may be welded, mechanically fastened or interlocked (or otherwise suitably fastened) to the upper portions 68, 64 and lower portions 66, 70 of inboard and outboard hinge arms 16, 14.

While multiple embodiments have been described in detail, it will be apparent to those skilled in the art that the disclosed embodiments may be modified. Therefore, the foregoing description is to be considered exemplary rather than limiting.

What is claimed is:

1. A simultaneous single rail movement system for a vehicle door, comprising:
    an outboard hinge arm having a first outboard end and a second outboard end, the outboard hinge arm being pivotally mounted to a vehicle body structure at the first outboard end, the outboard hinge arm having a first point and a second point;
    an inboard hinge arm having a first inboard end and a second inboard end, the inboard hinge arm being pivotally mounted to the vehicle body structure at the first inboard end;

a rail mounted to the vehicle door and operatively configured to receive a slide member, the slide member being pivotally mounted to the first point of the outboard hinge arm and the second inboard end; and a guide track adjacent to the rail and operatively configured to receive the second point of the outboard hinge arm, the guide track including a substantially curved portion and a substantially linear portion, the substantially curved portion of the guide track extending beyond the rail in a longitudinal direction aft of the rail in a manner sufficient to facilitate continuous and smooth movement of the door upon opening and upon closing.

2. The simultaneous movement system as defined in claim 1 wherein the guide track is integral with the rail.

3. The simultaneous movement system as defined in claim 1 wherein the second point includes a tab which is operatively configured to slide within the guide track.

4. The simultaneous movement system as defined in claim 3 wherein the tab is mechanically fastened to the outboard hinge arm.

5. The simultaneous movement system as defined in claim 1 wherein the second point includes a projection integral with the outboard hinge arm, the projection being operatively configured to slide within the guide track.

6. The simultaneous movement system as defined in claim 1, further comprising a rolling bearing disposed between the slide member and the rail.

7. The simultaneous movement system as defined in claim 1 wherein the guide track is operatively configured to cooperate with the outboard hinge arm to stop substantially articulating movement of the door at a full open position.

8. The simultaneous movement system as defined in claim 7 wherein the guide track is operatively configured to cooperate with the second point of the outboard hinge arm to stop the substantially articulating movement of the door at the full open position.

9. The simultaneous movement system as defined in claim 8 wherein the second point of the outboard hinge arm includes a projection that is operatively disposed within the guide track.

10. The simultaneous movement system as defined in claim 1 wherein the outboard hinge arm includes an upper outer portion and a lower outer portion; and wherein a substantially planar member is disposed between the upper outer portion and the lower outer portion of the outboard hinge arm.

11. The simultaneous movement system as defined in claim 1 wherein the inboard hinge arm includes an upper inner portion and a lower inner portion; and wherein a substantially planar member is disposed between the upper inner portion and the lower inner portion of the inboard hinge arm.

* * * * *